April 28, 1970 J. F. YELLO 3,509,361

TIMER CIRCUIT

Filed Oct. 17, 1968

Inventor
Joseph F. Yello
By Eugene M. Cummings
Agent

United States Patent Office 3,509,361
Patented Apr. 28, 1970

3,509,361
TIMER CIRCUIT

Joseph F. Yello, Wood Dale, Ill., assignor to Zenith Radio Corporation, Chicago, Ill., a corporation of Delaware Filed Oct. 17, 1968, Ser. No. 768,469
Int. Cl. H03k 17/28
U.S. Cl. 307—141 8 Claims

ABSTRACT OF THE DISCLOSURE

A timing system for de-energizing a radio receiver or the like after a predetermined time interval comprises a Darlington-pair switch device having principal electrodes serially connected between the receiver and its battery and a control electrode coupled to a capacitive discharge timing circuit for maintaining the Darlington-pair in saturated and non-saturated conditions during the operating interval. Because supply voltage variations distort the receiver while the switch device is in a non-saturated condition, an additional switch device responsive to the voltage drop across the principal electrodes minimizes this period by accelerating discharge of the timing capacitor after the switch device comes out of saturation. A capacitor may also be connected between the principal and control electrodes of the switch device to provide positive feedback for preventing the current demands of high level audio peaks from removing the device from saturation. Because of its economy, compactness, low battery drain and ease of installation the timing system is especially well suited for use in battery operated transistor radio receivers.

BACKGROUND OF THE INVENTION

The present invention relates to timing systems, and more particularly to an economical solid-state timing circuit for providing delayed de-energization of a radio receiver.

The majority of clock-radio receivers feature a "sleep-switch," which de-energizes the receiver after a predetermined time interval to allow a listener to go to sleep while listening to the receiver. While this same feature would also be desirable on small battery-operated transistor portable receivers, the complexity, cost and bulkiness of known mechanical timing mechanisms and the complexity, cost, high current drain and generally unsatisfactory performance of prior-art electronic timers have heretofore made this feature impracticable for such receivers.

Accordingly, it is a general object of the invention to provide a new and improved electronic timing system for de-energizing a controlled device, such as a radio receiver, following a predetermined time interval.

It is a more specific object of the invention to provide an economical electronic timing system for de-energizing a battery-operated radio receiver following a predetermined time interval which does not subject the radio receiver batteries to objectionable current drain.

It is a still more specific object of the invention to provide an electronic timing system for de-energizing a radio receiver after a predetermined time interval which provides a rapid transition between energized and de-energized states.

In accordance with the invention, an electronic timing system for de-energizing after a predetermined time interval a controlled device operable from a power source, such as a radio receiver or the like, comprises an electronic switch device having a pair of principal electrodes and a control electrode, and saturated and non-saturated operating states, the voltage across the principal electrodes being substantially constant at a predetermined value while the device is in the saturated state and varying undesirably with load current drawn through the principal electrodes while in the non-saturated state. Means serially including the principal electrodes are provided for coupling the control device to the power source, and means including a timing capacitor coupled to the control electrode maintain the switch device in the saturated state for a predetermined time interval, and in the non-saturated condition for an additional time interval. Means comprising an additional switch device having additional principal electrodes shunt-connected across the capacitive timing circuit and an additional control electrode coupled to the principal electrodes of the first switch device and responsive to the voltage drop thereacross are further provided for accelerating the discharge of the timing capacitor following the predetermined time interval to shorten the non-saturated operating period of the first switch device.

BRIEF DESCRIPTION OF THE DRAWING

The features of this invention which are believed to be novel are set forth with particularity in the appended claims. The invention, together with further objects and advantages thereof, may best be understood by reference to the following description taken in conjunction with the accompanying drawing, in the several figures of which like reference numerals identify like elements, and in which:

DESCRIPTION OF THE PREFERRED EMBODIMENT

Figure 1:
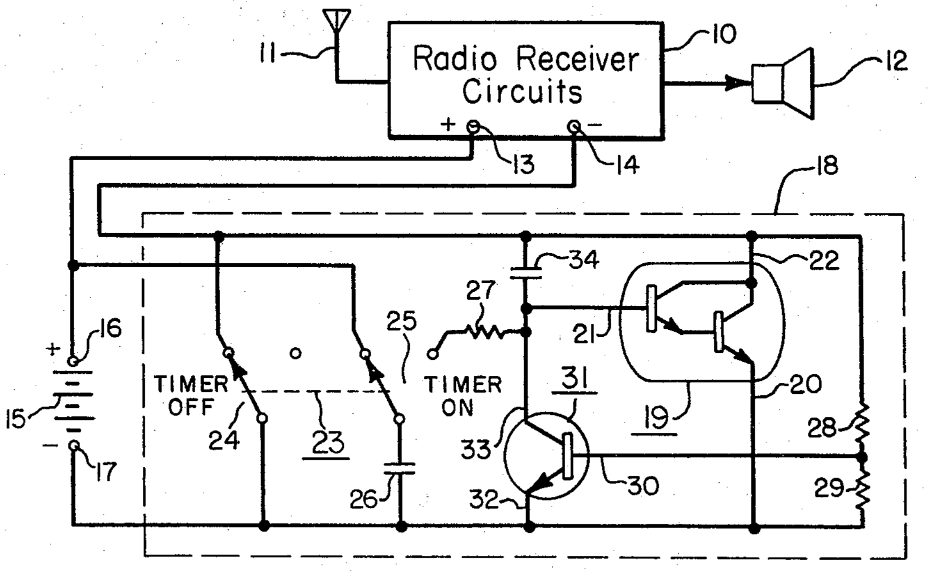
FIGURE 1 is a schematic circuit diagram partially in block form, of a radio receiver incorporating an electronic timing system constructed in accordance with the invention.

The invention is illustrated in FIGURE 1 as employed in conjunction with a conventional solid-state superheterodyne radio receiver, the various circuits of which are collectively illustrated in block form as radio receiver circuits 10. A conventional antenna 11 is coupled to the input of circuits 10, and a conventional loudspeaker 12 is coupled to the output. Receiver circuits 10 are operable from a unidirectional (DC) current applied with positive and negative polarities across terminals 13 and 14, respectively. A battery 15, having a positive terminal 16 and a negative terminal 17, serves as the source of unidirectional current for the receiver.

In accordance with the invention, the radio receiver is adapted to be de-energized after a predetermined time interval by an electronic timing system, identified in FIGURE 1 by dashed outline 18. To this end, the negative terminal 17 of battery 15 is connected to terminal 14 by way of the principal electrodes of an electronic switch device 19, which preferably comprises a Darlington-pair device having a principal input electrode or emitter 20, a control electrode or base 21 and a principal output electrode or collector 22. Battery terminal 17 is connected to emitter 20 and collector 22 is connected to terminal 14. The positive battery terminal 16 is connected directly to the positive input terminal 13 of receiver circuits 10.

Timing system 18 includes a function switch 23 having two sets of double-throw contacts 24 and 25. In the TIMER OFF position of this switch, contacts 24 complete the circuit between battery terminal 17 and terminal 14, and contacts 25 simultaneously connect one terminal of a timing capacitor 26 to battery terminal 16, the other terminal of capacitor 26 being connected directly to battery terminal 17. In the TIMER ON mode, contacts 24 open to interrupt the direct connection from battery terminal 17 to terminal 14, and contacts 25 transfer one terminal of capacitor 26 from battery terminal 16 to the control electrode 21 of switch device 19 via a series-connected timing resistor 27.

A voltage divider in the form of a pair of series-connected resistors 28 and 29 is shunt-connected from collector 22 to emitter 20 and the juncture of these resistors is connected to the control electrode, or base 30, of an additional electronic switch device 31. The input electrode, or emitter 32 of this device is connected to battery terminal 17 and the output electrode, or collector 33 is connected to the control electrode 21 of switch device 19.

During normal operation of the receiver, function switch 23 is in the TIMER OFF position, which allows receiver circuits 10 to be powered directly by the battery through contacts 24 of mode switch 23. Simultaneously, timing capacitor 26 is charged to the terminal voltage of battery 15 by virtue of being shunt-connected across the battery by switch contacts 25. When the timing circuit is activated by throwing the function switch to the TIMER ON position, the direct connection between battery terminal 17 and terminal 14 is broken and the battery-potential charge on timing capacitor 26 is applied through resistor 27 to the base 21 of switch device 19. The current flow resulting from the discharge of capacitor 26 through the base and emitter electrodes of device 19 conditions conduction between the emitter and collector electrodes of that device, re-establishing a conductive path between battery terminal 17 and terminal 14 and allowing the receiver to again operate.

The radio continues to operate as long as sufficient discharge current flows from timing capacitor 26 to maintain device 19 sufficiently conductive. Since capacitor 26 will be ordinarily initially charged to the potential of battery 15, the duration of the timing period is determined by the discharge rate of the capacitor, which in turn is dependent primarily on the impedance of the discharge path, i.e. the series combination of resistor 27 and the base to emitter impedance of device 19.

During most of the timing period switch device 19 is in full conduction, or in saturation, and the voltage drop across its collector and emitter terminals $V_{CE}$ is substantially constant at $V_S$. However, as capacitor 26 is discharged through resistor 27 and the finite base to emitter impedance of switch device 19, a threshold value is eventually reached at which saturation or full conduction in device 19 is no longer maintained. Unfortunately, operation of the receiver while device 19 is unsaturated may be unsatisfactory because the voltage drop across device 19, and hence the voltage applied to the receiver circuits 10, varies as a function of load current, which causes the oscillator circuitry included in circuits 10 to shift frequency and the class B audio output stage normally included therein to distortion audio peaks. This can be seen by reference to FIGURE 2, which is an idealized plot of collector current vs. collector voltage for switch device 19 for different values of base current $Ib_1$–$Ib_4$. Referring to the normal volume load line, which represents the receiver load at normal listening levels, base currents $Ib_1$–$Ib_3$ would provide satisfactory operation, $V_{CE}$ remaining substantially constant at the saturation voltage $V_S$. However, in the transition zone $Ib_3$–$Ib_4$ receiver circuits 10 would experience considerable supply voltage variation, resulting in possible oscillator shift and audio distortion.

To minimize the duration of this period, the system includes means in the form of voltage divider resistors 28 and 29 and switch device 31 for accelerating the discharge of timing capacitor 26 when a predetermined state of discharge is reached. In particular, beyond saturation $V_{CE}$, previously constant at $V_S$, starts to increase, causing the potential applied to the control electrode 30 of switch device 31 to also increase. Resistors 28 and 29 are selected so that when $V_{CE}$ reaches a predetermined value, $V_X$, switch device 31 becomes conductive and forms a relatively low-impedance discharge path for capacitor 26 through resistor 27 and the emitter-base junction of device 31. This greatly accelerates the further discharge of capacitor 26 and conduction through device 19 continues to decrease eventually falling below the level at which radio receiver circuits 10 can operate.

Figures 2, 3:
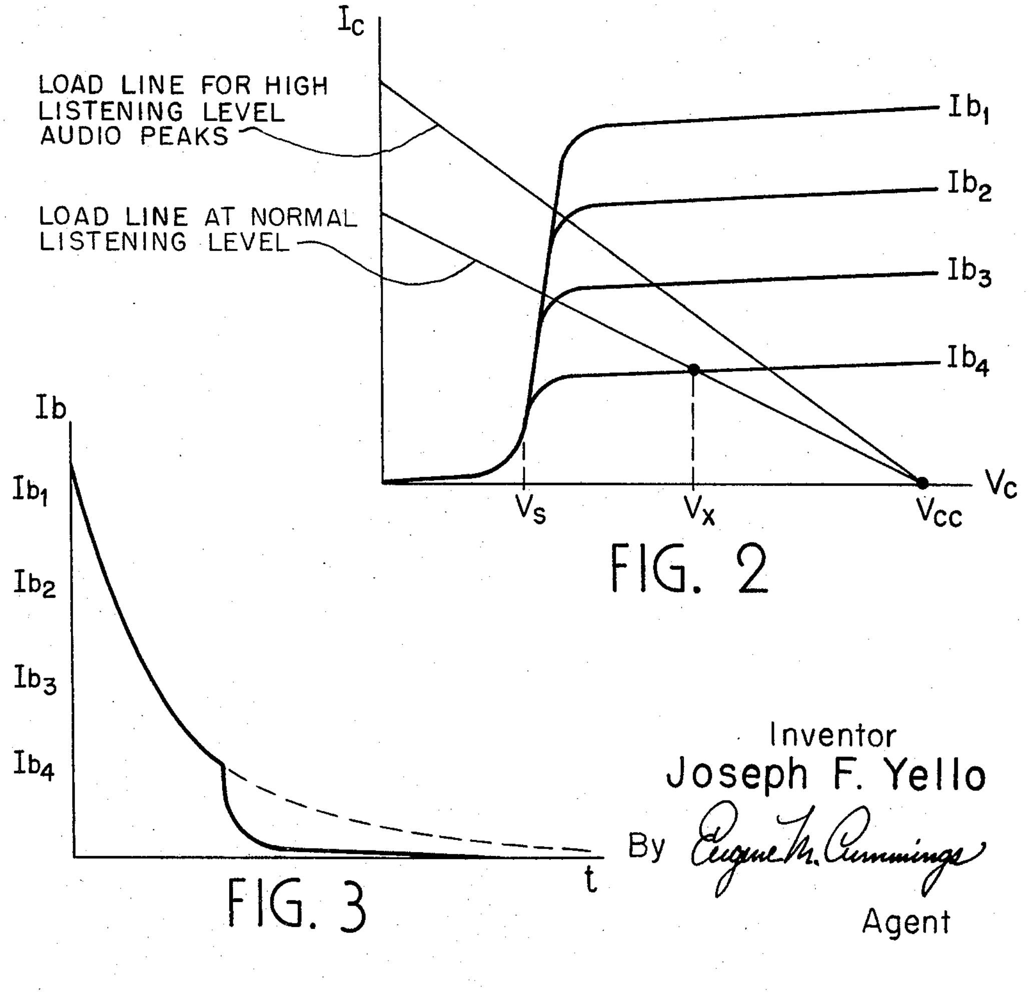
FIGURE 2 is a graphical presentation of the collector current vs. collector voltage of a component in the electronic timing system of FIGURE 1.
FIGURE 3 is a graphical presentation of the discharge current vs. time characteristic of another component in the electronic timing system of FIGURE 1.

The effectiveness of switch device 31 on the discharge of capacitor 26 can be seen by reference to FIGURE 3, which is a plot of discharge current versus time for a normal receiver listening level. Initially at $Ib_1$, the discharge current decays exponentially with time to $Ib_4$, at which point switch device 19 is no longer in saturation and $V_{CE}$ has risen to $V_X$, which is sufficient to trigger switch device 31 into conduction. Because of the low impedance discharge path of device 31, the remaining portion of the discharge cycle is much more rapid, the current $Ib$ rapidly reaching a value at which switch device 19 is no longer sufficiently conductive to operate radio receiver circuits 10.

While switch device 31 is effective in minimizing the duration of the distortion-prove period between saturation and cut-off in device 19, there remains a period near the end of the timing cycle at which the base current supplied by timing capacitor 26 is no longer sufficient to prevent switch device 19 from being driven out of saturation by the increased current demands of the receiver class B audio stage which accompany high level audio peaks. Referring again to FIGURE 2, it will be recalled that base currents $Ib_1$–$Ib_3$ provided satisfactory operation at normal listening levels by maintaining device 19 in saturation and $V_{CE}$ constant at $V_S$. However, with the increased current demands accompanying audio peaks at higher listening levels, as evidenced by the steeper load line in FIGURE 2, a higher base current is required to maintain device 19 in saturation during these peaks. In particular, a base current in excess of $Ib_2$ is now required, whereas at the lower listening level a current in excess of $Ib_3$ was sufficient.

To minimize the oscillator shift and distortion which would otherwise accompany high level audio peaks as switch device 19 approaches the transition from saturated to unsaturated operation, a capacitor 34 is connected between the collector and base of switch device 19. Now, as peak current demands increase with increases in audio output level, the increases in collector current are coupled in-phase to the base to momentarily enhance the base current $Ib$, and hence the collector current of device 19. The resulting positive feedback results in a marked reduction in distortion caused by voltage fluctuations, especially as device 19 nears the point at which it will no longer be in saturation at normal listening levels.

It will be appreciated that the Darlington pair employed as switch device 19 can be considered a pair of individual transistors connected in a configuration which gains the advantage of extremely high gain ($H_{fe}$) and high input impedance, and could be simulated by separate devices connected in the illustrated circuit configuration. Furthermore, while silicon devices have been illustrated, it would of course be possible to utilize germanium devices for the switching elements by making appropriate polarity changes.

Because the only connections necessary to the receiver are to its power leads, the invention is easily wired into existing radio receiver chassis with a minimum of time and labor. Furthermore, because it is economical to manufacture, lends itself readily to miniaturization, and introduces negligible battery drain, the invention is ideally suited for use with small portable battery operated receivers. Delay periods in excess of 45 minutes are easily obtainable with no deterioration in receiver performance, and by use of a relay in the load circuit, the invention can be used to control high wattage appliances such as television receivers.

In order to afford a more complete and specific illustration of the invention, suitable circuit parameters for a timing circuit constructed in accordance with the illustrated embodiment of the invention are set forth hereinafter. It will be appreciated that this material is included solely by way of illustration and in no sense by way of limitation.

C26—500 microfarads
C34—10 microfarads
R27—1 megohm
R28—47,000 ohms
R29—22,000 ohms
B15—9 volts
T19—(GE)T16P4 Darlington Amp.
T31—(Fairchild)—SE5001

While a particular embodiment of the present invention has been shown and described, it will be obvious to those skilled in the art that changes and modifications may be made without departing from the invention in its broader aspects. Accordingly, the aim in the appended claims is to cover all such changes and modifications as may fall within the true spirit and scope of the invention.

I claim:

1. An electronic timing system for de-energizing after a predetermined time interval a controlled device operable from a power source, such as a radio receiver or the like, comprising:

an electronic switch device having a pair of principal electrodes and a control electrode, and saturated and non-saturated operating states, the voltage across said principal electrodes being substantially constant at a predetermined value while said device is in said saturated state and varying undesirably with load current drawn through said principal electrodes while in said non-saturated state;

means serially including said principal electrodes for coupling said controlled device to said power source;

means including a timing capacitor coupled to said control electrode for maintaining said switch device in said saturated state for a predetermined time interval and in said non-saturated state for an additional time interval; and means comprising an additional switch device having additional principal electrodes shunt-connected across said capacitive timing circuit and an additional control electrode coupled to said principal electrodes of said first switch device and responsive to said voltage drop thereacross for accelerating the discharge of said timing capacitor following said predetermined time interval to shorten the non-saturated operating period of said first switch device.

2. An electronic timing system as described in claim 1 wherein said electronic switch comprises a pair of transistors connected in a Darlington-pair configuration.

3. An electronic timing system as described in claim 1 wherein said timing means further comprises a two-position switch which in its first position couples said timing capacitor to said power source to charge said capacitor to at least a portion of the terminal voltage of said source, and in its second position couples said timing capacitor to said control electrode for providing, in co-operation with the input impedance of said control electrode, a discharge path for controlling the conduction between said principal electrodes of said switch device.

4. An electronic timing system as described in claim 1 wherein said discharge accelerating means further comprises a voltage divider shunt-connected across the principal electrodes of said switch device and having a tap coupled to said additional control electrode of said additional switch device.

5. An electronic timing system as described in claim 1 wherein said principal electrodes are emitter and collector electrodes and said control electrode is a base electrode.

6. An electronic timing system as described in claim 1 wherein said system further comprises means for coupling at least a portion of the load current variations in said controlled device to said control electrode in-phase, thereby providing additional current to said control electrode to aid in maintaining said switch device in saturation during periods of increased current demand by said controlled device.

7. An electronic timing system as described in claim 6 wherein said coupling means comprises a capacitor coupled between one of said principal electrodes and said control electrode of said electronic switch device.

8. An electronic timing system as described in claim 7 wherein said principal electrodes comprise emitter and collector electrodes, said control electrode is a base electrode, and said capacitor is coupled between said collector and base electrodes.

References Cited

UNITED STATES PATENTS 3,407,312 10/1968 Pearse et al. -------- 307—141

ROBERT K. SCHAEFER, Primary Examiner

T. B. JOIKE, Assistant Examiner

U.S. Cl. X.R.

307—293